Dec. 14, 1943.    A. H. BATCHELDER ET AL    2,336,919
PROCESS OF OXIDIZING ORGANIC SUBSTANCES
Filed Dec. 13, 1941
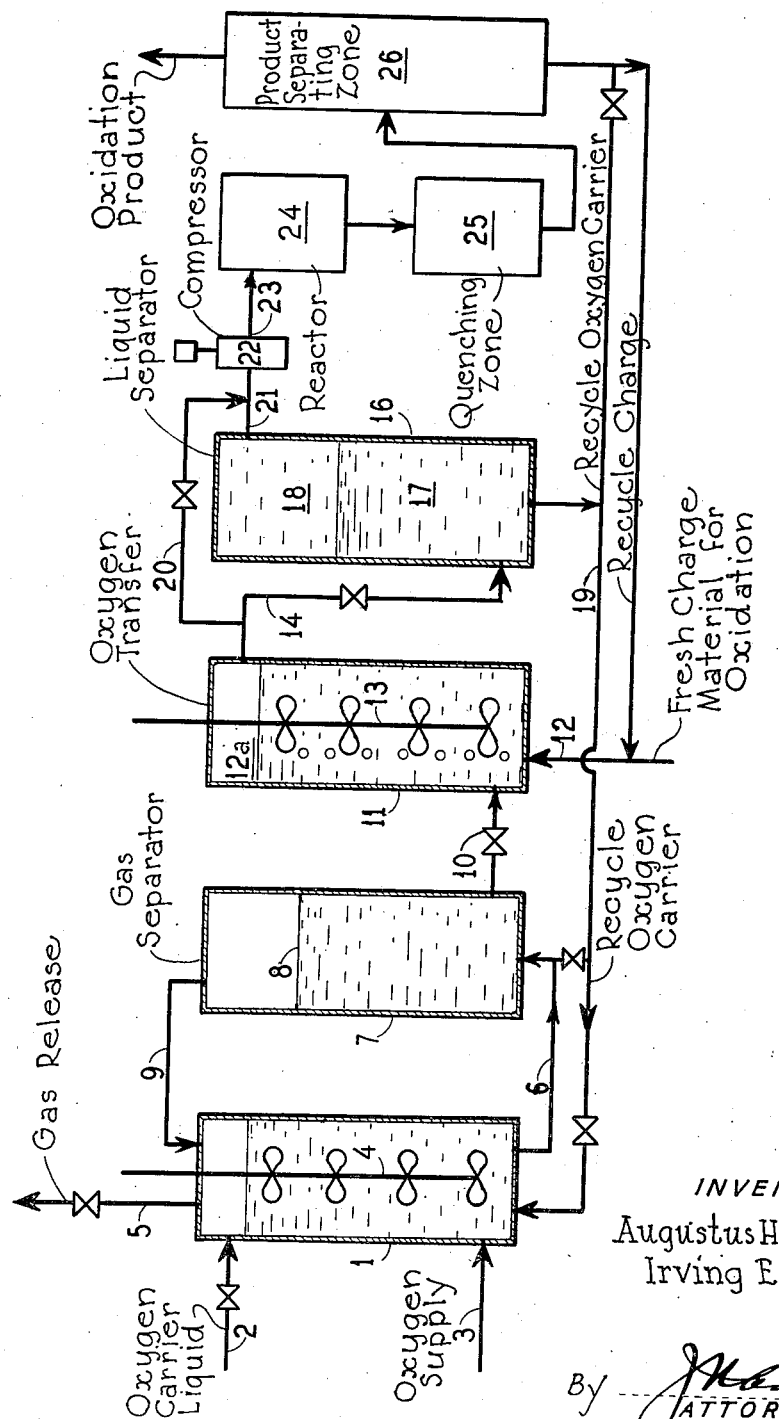
INVENTORS
Augustus H. Batchelder
Irving E. Levine
By _____
ATTORNEY Patented Dec. 14, 1943

2,336,919

UNITED STATES PATENT OFFICE 2,336,919

PROCESS OF OXIDIZING ORGANIC SUBSTANCES

Augustus H. Batchelder and Irving E. Levine, Berkeley, Calif., assignors to Standard Oil Company of California, San Francisco, Calif., a corporation of Delaware Application December 13, 1941, Serial No. 422,852

11 Claims. (Cl. 260—451)

The present invention pertains to an improved process for the oxidation of organic substances by means of elementary oxygen, and more particularly to a process wherein the oxidation is controlled to produce specific partial-oxidation products.

Many processes have hitherto been proposed for the oxidation of organic materials, and particularly hydrocarbons, by means of free elementary oxygen to produce various specific products containing a higher ratio of oxygen to carbon or a lower ratio of hydrogen to carbon, or both, than present in the original material undergoing oxidation. While these processes have shown considerable variation in that the material subjected to oxidation has been in the solid, liquid or gaseous phase, the oxygen has invariably been supplied in the gas phase as more or less pure oxygen or as air. These processes have accordingly all possessed the same two major objections: namely, the lack of positive control to produce only the product or products of the desired degree of oxidation and, in most cases, an even more serious lack of control resulting in such high explosion hazards as to make the processes quite impractical except under certain limited and highly specific circumstances.

It is the object of the present invention to provide a process for the oxidation of the more or less readily oxidizable organic materials by means of elementary oxygen which is susceptible of ready control to produce any desired product of partial oxidation to the substantial exclusion of other products and which is entirely free of the usual explosion hazard.

We have discovered that the foregoing objects may be realized by first loading or charging a substantially noncombustible oxygen-carrier liquid with oxygen, under appropriate temperature and pressure conditions, then effecting a transfer of oxygen from this solution to produce a solution in the organic material to be oxidized and in this manner permitting the oxidation reaction to be carried out under conditions such that no gaseous oxygen and no gas containing oxygen ever comes in contact with the material being oxidized. This method of positively limiting the amount of oxygen available to the oxidizable material at every point in the process to the quantity dissolved in the oxidizable material, and hence to an amount sufficient to oxidize only a relatively small portion of the total oxidizable material, has been found to make possible the arrest of the oxidation reaction at any desired point short of complete oxidation and to positively eliminate all chance of explosion since any product of oxidation that might be formed from the limited amount of oxygen available would still be soluble in the liquid phase remaining under the conditions of operation and the maximum amount of heat possible of liberation per unit of reactor space is positively limited and readily dissipated.

The feature of maintaining the oxidizable material and the oxidizing agent both in a single homogeneous phase has been found, in addition to reducing the hazards of operation, as mentioned above, to make possible an unusually high degree of control over the extent of any given oxidation reaction as regards the production of partial or limited oxidation products. This uniformity of control is apparently due to the fact that under these conditions all molecules of the oxidizable material have an equal chance at the limited number of oxygen molecules available and hence the chance of any one molecule proceeding through a second or third stage of oxidation before substantially all molecules have completed the first stage is not large. The same balance would, of course, prevail as to any subsequent stage.

The process of the present invention is applicable to any combustible organic material which is a fluid, liquid or gaseous, at the temperature of operation or which may be dissolved or dispersed in a suitably inert fluid vehicle. While the preferred class of materials which will be employed hereinafter for purposes of illustration are hydrocarbons, and especially the hydrocarbons derivable from natural or cracked petroleum stocks that are fluid at ordinary or but slightly elevated temperatures, the process is equally applicable to organic substances that already contain some oxygen, such as alcohols, aldehydes, ketones, esters, ethers, etc., and the degree of partial oxidation effected may be regulated at will to produce, for instance, peroxides, aldehydes, acids, oxy-acids or hydroxy acids from paraffin hydrocarbons, oxides or glycols from olefin hydrocarbons and aldehydes, acids, oxy-acids or acid anhydrides from aromatic or naphthenic hydrocarbons. When the substance to be oxidized is a solid and hence does not readily dissolve oxygen or permit its ready absorption from a contacting fluid phase, it may be dissolved in an appropriate solvent and submitted to oxidation in solution, according to the process of this invention. For instance, a high melting paraffin wax, asphalt or other bitumen might be dissolved in carbon tetrachloride, or other fluid solvent having a low tendency to oxidation, and the resulting solution be oxidized according to our method.

As already indicated, the process of the present invention contemplates the solution of gaseous oxygen in an appropriate noncombustible fluid, the transfer of oxygen from this fluid carrier to the organic substance to be oxidized by an appropriate contact of the two fluids and the subsequent oxidation of the organic material under sufficient hydrosatic pressure to prevent the evolution of any oxygen as gas at the temperature at which the oxidation is effected. Oxygen for preparation of the solution in the oxygen-carrier liquid may be supplied more or less pure from the cylinders in which it is now widely available, by the electrolysis of an aqueous solution under hydrostatic pressure sufficient to produce a solution of the desired concentration of oxygen or by contacting the oxygen-carrier with compressed air in any conventional form of apparatus designed to provide intimate contact between a gas and a liquid.

The oxygen-carrier may be any liquid that is substantially inert to oxidation at the temperature of the desired reaction so long as it possesses an appreciable power to dissolve oxygen and is itself not appreciably soluble in the organic liquid, solution or dispersion to be oxidized. Preferably also, the oxygen-carrier liquid should be one having a lower solubility for oxygen than has the substance or solution to be oxidized so that the transfer of oxygen in the transfer stage may be as rapid and complete as possible. Various oxygen-carrier liquids that have been found suitable to the process of the present invention, and particularly adapted for use with certain types of material or certain individual substances to be oxidized, include water and numerous aqueous solutions, sulfuric acid, phosphoric acid, tricresyl phosphate, acetic acid, acetic anhydride, sulfur dioxide, ammonia, and mercury at pressures and temperatures at which the oxide is not stable.

In its broadest concept the oxygen transfer step of the present invention may take any form whatever whereby sufficient time and intimacy of contact between the substantially immiscible oxygen-carrier liquid and the organic substance to be oxidized is effected to permit oxygen dissolved in the former to pass into the latter until distribution equilibrium is substantially reached. This may be accomplished by the mere violent agitation of the two liquids in a closed container, by finely dispersing either liquid in the other or, when time permits, by simply causing one liquid to pass through the other under the influence of gravity. Sometimes it will be found desirable to separate the two liquid phases before passing the organic substance to be oxidized, in which the oxygen for its oxidation has been dissolved, to the oxidation stage of the process. Under other circumstances, and especially when the oxygen-carrier liquid is water or an aqueous solution, it may be desirable to pass the dispersion of oxygen-carrier liquid and oxidizable material to the reaction zone without separation. When operating by this method the presence of the aqueous phase may serve the dual purpose of providing increased temperature control and of providing a medium into which the products of oxidation may pass as rapidly as formed.

In a preferred embodiment of the process of our invention it may be applied to the oxidation of a petroleum hydrocarbon which may be solid, liquid or gaseous at ordinary temperatures, such as a low melting paraffin wax, a kerosene fraction, or a normally geaseous hydrocarbon such as butane, with water or an aqueous solution as the oxygen-carrier liquid. The water is first charged with oxygen by contacting it with air at such temperature and pressure as will give a solution containing sufficient oxygen to transfer the desired quantity to the hydrocarbon to be oxidized in view of the partition coefficient existing between the water and the hydrocarbon at the temperature in question. Ordinarily the solution of oxygen in the water will be prepared at ordinary temperature and under sufficient pressure to give the desired oxygen concentration in the hydrocarbon after partition equilibrium is established. The transfer of oxygen from the water to the hydrocarbon is effected by providing efficient contact between the two phases, also usually at atmospheric temperature and at a pressure at least as high as that at which the oxygen solution in the carrier liquid is prepared. This oxygen transfer step may, however, sometimes be advantageously effected at highter temperatures. After oxygen equilibrium has been established between the two substantially immiscible liquids, they are separated and the hydrocarbon phase, now carrying in solution the oxygen for the desired reaction, is subjected to a hydrostatic pressure sufficient that when its temperature is raised to the desired temperature of reaction, no gaseous oxygen is evolved. This hydrocarbon solution is then passed to an appropriate oxidation zone maintained at the desired temperature or reaction which may be from about 100 to 500° C. or above.

The oxidation reaction may be effected in the presence of a catalyst, which catalyst may be either carried on a support in the oxidation zone, may be dissolved or suspended in the organic liquid being oxidized, may be dissolved or suspended in the oxygen-carrier liquid when operation is effected without separation, as above described, or may be suspended at the interface between the two liquid phases when operating in this manner.

The operation of our invention may be better understood by reference to the flow diagram represented in the accompanying figure. An initial zone for dissolving oxygen in the oxygen-carrier liquid is indicated at 1, the supply of oxygen-carrier liquid being fed thereto through valved line 2 and the oxygen supply through line 3. The zone may be provided with a stirrer 4, for effecting contact between the carrier liquid and the source of oxygen and should be provided with a gas release line 5 through which excess gas may be vented. Provision should be made so that any desired pressure may be maintained in the oxygen solution zone, as for instance up to 5,000 pounds or more per square inch. When the carrier liquid has taken up the required quantity of oxygen, it is passed through line 6 to a gas separator 7 wherein undissolved gas is collected and returned through line 9 to zone 1. The oxygen solution, free of any gas phase, is passed through valved line 10 to an oxygen transfer zone 11 wherein it is contacted by any appropriate means with the organic material to be oxidized, as for instance by means of a stirrer 13, or by permitting the organic material to pass by gravity from line 12 through the oxygen-carrier liquid and collect in a layer 12a at the surface of the oxygen-carrier, it being understood, of course, that when the charge is of greater density than the carrier liquid, this layer will be at the bottom of the contact vessel and the connections to the vessel will be arranged accordingly.

The oxygen solution in hydrocarbon collected at 12a may be led through valved line 20 to compressor 22 wherein it may be subjected to a sufficient increase in hydrostatic pressure that no gaseous oxygen will separate at the temperature of the oxidation reaction. The liquid is then passed through line 23 to reactor 24. When, as will more often be desired, contact in the oxygen transfer vessel is effected by means of vigorous agitation, a dispersion of the one liquid in the other will exist at 12a. This dispersion may be passed through valved line 14 to liquid separator 16 wherein separation of the oxygen-carrier liquid from the organic oxidation charge is effected, the carrier liquid being returned through line 19 to zone 1 for resaturation with oxygen or to line 6 for dilution of the oxygen solution passing to separator 7. The oxygen solution in the oxidizable liquid collected at 18 is passed through line 21 to compressor 22, line 23 and reactor 24 as above. When dispersion of oxygen-carrier liquid and oxidation charge is to be passed to the oxidation stage, without separation, as above described, the liquid separator 16 may be by-passed and the dispersion sent through valved line 20 to the compressor 22 and reactor 24.

The oxidation zone or reactor 24 may be provided with any appropriate means for temperature control and it is usually desirable to follow it immediately with a quenching zone 25 in which the temperature of the reaction mixture may be quickly reduced to such an extent that substantially all reaction is stopped and any undesirable deterioration of the product is substantially avoided. From this zone 25 the reaction mixture is passed to a product separating zone 26 which may comprise not only means for separating the oxidation product or products from the unreacted charge but also the separation of catalyst, oxygen-carrier liquid, etc., which means are not shown in detail.

The oxidation step of the process may, as indicated above, be desirably effected in the presence of an oxidation catalyst. This catalyst may be a solid, such as platinum, nickel, vanadium pentoxide, tin vanadate, etc., supported on an appropriate carrier positioned in the reactor 24 or dispersed in the reaction mixture passing therethrough. It may also be dissolved in the liquid or dispersion of liquids supplied to the reactor. When the substance undergoing oxidation is a hydrocarbon, metallo-organic catalysts, such as the metal naphthenates, oleates, stearates, etc., which are somewhat soluble in the hydrocarbon phase, may be employed. When the aqueous oxygen-carrier liquid dispersed in the hydrocarbon, or having the hydrocarbon dispersed in it, is sent forward to the oxidation reactor without separation of the two liquid phases, it has been found desirable to use an oxidation catalyst which will be suspended or concentrated at the interface between the two liquid phases. This concentration of the catalyst at the interface may be provided for by selecting polar catalyst materials, such as metallic soaps in which one part of the molecule is soluble in one of the liquid phases and another part of the molecule is soluble in the other liquid phase.

While, as already indicated, the process of the present invention is applicable to the oxidation of a wide variety of oxidizable organic materials, it has been found to be particularly adapted to the oxidation of hydrocarbons, such as those contained in the kerosene fraction from petroleum, for the production of hydrocarbon peroxides having utility in the preparation of superior fuels for Diesel motors and for the production of carboxylic acids and oxy-carboxylic acids for their various well-known uses in industry.

In further illustration of the process of our invention, a refined kerosene from California petroleum was submitted to oxidation. Water was employed as the oxygen-carrier and was saturated with oxygen under 3,000 pounds per square inch at 18° C. The resulting solution contained 0.305 gram mol of oxygen per liter. It was next brought to equilibrium at the same temperature and pressure with the liquid kerosene of specific gravity 0.80. The kerosene was found to have taken up 0.25 gram mol of oxygen per liter. Before passing this solution to oxidation at 200° C., it was necessary to increase the hydrostatic pressure on it to 3,700 pounds per square inch to prevent the evolution of gaseous oxygen at the higher temperature. After the oxidation a product consisting of naphthenic and oxynaphtheic acids was extracted by treatment with caustic soda solution and the remaining unoxidized kerosene was returned to the process.

It will be understood that the terms "elementary oxygen" and "molecular oxygen" as employed herein refer to oxygen in the free or chemically uncombined state, as it exists in air.

Having now described a process for the oxidation of organic substances which comprises saturating an inert liquid with oxygen, effecting a transfer of oxygen from said liquid to the organic material to be oxidized under conditions to prevent the liberation of gaseous oxygen and maintaining such condition during the subequent oxidation stage, we claim:

1. In a process for producing oxygen-containing partial oxidation products from hydrocarbons and chemically uncombined elementary oxygen, the step which consists of preparing a solution of molecular oxygen in a liquid aqueous medium and contacting the hydrocarbon to be oxidized with the said aqueous solution under conditions to permit the passage of oxygen from the aqueous to the hydrocarbon phase, while preventing the liberation of gaseous oxygen.

2. In a process for producing oxygen-containing partial oxidation products from substantially water insoluble combustible organic materials and chemically uncombined molecular oxygen, the steps of preparing an aqueous solution of chemically uncombined oxygen, contacting the organic material to be oxidized with said aqueous solution under conditions permitting the passage of oxygen from the aqueous to the organic phase, while preventing the liberation of gaseous oxygen, and subjecting the organic phase to a temperature at which its partial oxidation by the dissolved oxygen is effected.

3. Process for effecting the partial oxidation of hydrocarbons which comprises dissolving chemically uncombined oxygen in an aqueous liquid medium, contacting said aqueous medium containing dissolved chemically uncombined oxygen with the hydrocarbon to be oxidized while maintaining sufficient pressure that no gas phase containing oxygen is present, separating the hydrocarbon phase and subjecting it to a higher temperature under sufficient hydrostatic pressure to prevent the formation of a separate gas phase.

4. Process for effecting the partial oxidation of hydrocarbons which comprises dissolving chemically uncombined oxygen in an aqueous liquid phase under superatmospheric pressure, subjecting a hydrocarbon to sufficient pressure to maintain it in liquid phase, intimately dispersing one said phase in the other and subjecting the dispersion to a temperature at which oxidation of the hydrocarbon proceeds while maintaining the dispersion under sufficient pressure to prevent the formation of any gaseous phase.

5. Process for effecting the partial oxidation of hydrocarbons as in claim 4 wherein an oxidation catalyst is maintained at the interface between the aqueous and hydrocarbon phases.

6. Process for effecting the partial oxidation of hydrocarbons as in claim 3 wherein the hydrostatic pressure on the separated hydrocarbon phase is increased prior to any substantial increase in its temperature above that at which it was contacted with the oxygen-carrier liquid.

7. In a process of producing valuable partial oxidation products from an oxidizable organic material and chemically uncombined elementary oxygen, the improvement which comprises dissolving chemically uncombined oxygen in the organic material at a temperature below the temperature of oxidation and then sufficiently increasing the hydrostatic pressure on the resulting solution that no gaseous oxygen will separate at the higher temperature of the oxidation step.

8. Process for the partial oxidation of hydrocarbons as in claim 3 wherein the increased hydrostatic pressure is produced by thermal expansion of the hydrocarbon liquid in a confined space.

9. Process for effecting the partial oxidation of readily oxidizable organic materials by chemically uncombined elementary oxygen which comprises saturating an oxygen-carrier liquid that is relatively inert to oxidation and does not form a single homogeneous phase with the said organic material with chemically uncombined oxygen, separating undissolved oxygen and contacting the saturated oxygen-carrier liquid and the organic material under conditions to effect a transfer of oxygen from the former to the latter without the formation of a gas phase containing oxygen.

10. Process for effecting oxidation as in claim 9 wherein the oxidizable organic material is dissolved in a liquid solvent which is inert to oxidation and insoluble in the oxygen-carrier liquid.

11. Process for effecting oxidation as in claim 9 wherein the transfer of oxygen from oxygen-carrier liquid to oxidizable organic material is effected by forming an intimate dispersion of the one in the other and the dispersion is subjected to a temperature sufficient to bring about substantial oxidation of the organic material while maintaining said dispersion.

AUGUSTUS H. BATCHELDER.
IRVING E. LEVINE.